(12) United States Patent
Heron et al.

(10) Patent No.: US 8,978,692 B2
(45) Date of Patent: Mar. 17, 2015

(54) PILOT VALVE FOR A PRESSURE REDUCING VALVE

(75) Inventors: Roger Heron, Bedford (GB); Andrew Roland Burrows, Soberton (GB)

(73) Assignee: i20 Water Limited, Southampton (GB)

( * ) Notice: Subject to any disclaimer, the term of this patent is extended or adjusted under 35 U.S.C. 154(b) by 543 days.

(21) Appl. No.: 12/532,566

(22) PCT Filed: Mar. 20, 2008

(86) PCT No.: PCT/GB2008/001018
§ 371 (c)(1),
(2), (4) Date: Feb. 1, 2010

(87) PCT Pub. No.: WO2008/114036
PCT Pub. Date: Sep. 25, 2008

(65) Prior Publication Data
US 2010/0126601 A1   May 27, 2010

(30) Foreign Application Priority Data

Mar. 22, 2007  (GB) .................................. 0705538.7
Nov. 14, 2007  (GB) .................................. 0722343.1
Jan. 24, 2008  (WO) ................ PCT/GB2008/000265

(51) Int. Cl.
*G05D 16/20* (2006.01)
*G05D 16/16* (2006.01)

(52) U.S. Cl.
CPC .......... *G05D 16/2093* (2013.01); *G05D 16/163* (2013.01)
USPC ........ 137/488; 137/12; 137/495; 137/505.25; 137/505.38; 137/557; 251/310

(58) Field of Classification Search
CPC ... G05D 16/10; G05D 16/103; G05D 16/106; G05D 16/0622; G05D 16/0638; G05D 16/0658; G05D 16/0666; F17C 2205/0338
USPC .......... 137/494, 495, 505.21, 505.25, 505.26, 137/505.28, 505.29, 505.36, 505.38, 137/505.44, 557, 12, 488; 251/310
See application file for complete search history.

(56) References Cited

U.S. PATENT DOCUMENTS 1,148,805 A * 8/1915 Skiffington ................... 137/495
4,027,923 A * 6/1977 Saito ............................. 303/9.71

(Continued)

FOREIGN PATENT DOCUMENTS

EP  0574241  12/1993
GB  2123983  2/1984

(Continued)

*Primary Examiner* — William McCalister
(74) *Attorney, Agent, or Firm* — McDonnell Boehnen Hulbert & Berghoff LLP

(57) ABSTRACT

A pilot valve (2) for controlling operation of a hydraulically-actuated pressure reducing valve, the pilot valve including a housing (4), and a first valve member (15) mounted in the housing for longitudinal movement along an axis relative to the housing and to a second valve member (22) in response to the outlet pressure of the pressure reducing valve. The first valve member is provided with an aperture (20) and the second valve member comprises a closure portion which varies the effective flow cross section of the aperture in accordance with relative longitudinal movement between the first and second valve members. An adjuster (26) controls the relative rotational position of the first and second valve members, the closure portion having a profile such that relative rotation between the first and second valve members causes the closure portion to vary the effective flow cross section of the aperture (20).

26 Claims, 6 Drawing Sheets

(56) References Cited

U.S. PATENT DOCUMENTS

| | | | |
|---|---|---|---|
| 4,083,380 A * | 4/1978 | Huber | 137/505.25 |
| 4,200,911 A | 4/1980 | Matsumoto | |
| 5,427,350 A | 6/1995 | Rinkewich | |
| 6,017,193 A | 1/2000 | Takeuchi | |
| 6,371,156 B1 | 4/2002 | Walton | |
| 7,201,108 B2 | 4/2007 | Uri Epharat et al. | |
| 7,275,559 B2 * | 10/2007 | Morrison et al. | 137/505.25 |
| 2006/0254652 A1 * | 11/2006 | Davidson | 137/505.25 |

FOREIGN PATENT DOCUMENTS

| | | |
|---|---|---|
| GB | 2405957 | 3/2005 |
| JP | 2001-280597 | 10/2001 |
| WO | 99/23544 | 5/1999 |
| WO | 03/057998 | 7/2003 |
| WO | 2008/090359 | 7/2008 |

* cited by examiner

PILOT VALVE FOR A PRESSURE REDUCING VALVE

This invention relates to a pilot valve for a pressure reducing valve, and particularly but not exclusively relates to the control of liquid pressure in a liquid distribution system. In preferred embodiments, the invention is concerned with the control of the pressure of water supplied to a region from a high pressure mains supply, and more particularly with the supply of water to a district metering area (DMA). However, the invention is also applicable to the supply of water or other liquids in other circumstances, such as in a large industrial complex.

The pressure in a mains water distribution system is created by pumps and/or the gravity head of water in a reservoir, water tower or the like. The pressure in the main arterial supply conduits is significantly higher that that required by consumers, whether domestic, agricultural or industrial. In a typical distribution system, a number of consumers are arranged in a region to which water supplied from the main arterial supply network by a pressure reducing valve (PRV). Typically, this region is referred to as a DMA.

Historically, the output pressure of the PRV has been fixed. Although there are several variations in design of PRY, a globe diaphragm actuated valve is the industry standard in the United Kingdom. Some valves are set-up to create a fixed reduction in pressure, regardless of flow rate. Others can be fitted with pilot valves, which alter the position of the valve such that it automatically gives a fixed outlet pressure regardless of inlet pressure or flow rate. The fixed output pressure must be sufficiently high to ensure adequate pressure throughout the DMA, and in particular at the highest and/or furthest point from the PRV in the DMA, under maximum anticipated flow rates. The highest and/or furthest point is known as the Critical Point. However, it should be appreciated that within a particular DMA there may be more than one Critical Point, and that the Critical Point where the supplied pressure is lowest may vary with time of day, period of the year and so forth.

A problem with such an arrangement is that at certain times of day or year, under certain conditions within the DMA and so forth, the fixed pressure may be higher than that necessary to ensure an adequate pressure at the or each Critical Point.

It is known that there is a relationship between system pressure and both leakage flow rates and burst rates in a DMA. In order to reduce leakage and burst occurrences, it has been proposed that the output of the PRV should be variable so that the pressure can be varied depending on demand, thus reducing the average pressure within the DMA and reducing problems with leakages and bursts. Other advantages of controlling the pressure actively include reduced fatigue on the pipe network, the provision of more constant supply pressure to consumers, and a reduction in pressure related consumption.

WO 9923544 discloses a pilot valve for controlling operation of a hydraulically-actuated pressure reducing valve. The pilot valve includes a housing, a first valve member mounted in the housing for movement relative thereto in response to the outlet pressure of the PRV, a second valve member mounted in the housing for movement relative thereto, and an adjuster for adjusting the position of the second valve member relative to the housing. The pilot valve is designed to control operation of the PRV according to the relative positions of the first and second valve members. The outlet pressure of the PRV is adjusted as a function of the flow rate, allowing lower outlet pressures at times of low demand whilst ensuring adequate pressure for consumers at times of peak demand. It is stated that because the adjuster acts on the second valve member, allowing its position to be adjusted relative to the housing, only a relatively small adjusting force is needed. It is also stated that the outlet pressure of the PRV can therefore be adjusted easily. In terms of construction, the first valve member comprises a nozzle and the second valve member comprises a seat. Relative longitudinal movement between the nozzle and the seat controls the flow in the pilot valve. The adjuster moves the seat towards and away from the nozzle.

One chamber of the pilot valve in WO 9923544 is connected to the output side of the PRV and is thus exposed to the output pressure. Another chamber of the pilot valve is connected to a control chamber of the PRV and, via a restriction, to the input side of the PRV.

When the pilot valve is in equilibrium, the water pressure acting on a diaphragm balances the force exerted by a spring. Water is discharged from the nozzle onto the seat at a steady rate and the volume of water in the control chamber of the PRV is constant. When output pressure falls due to increased demand or any other reason, such as a leak developing, the pressure acting beneath the pilot valve diaphragm initially falls and the pilot valve opens. This causes water to be discharged from the control chamber of the PRV with the result that the main valve of the PRY opens and the outlet pressure increases.

As the outlet pressure increases the force acting beneath the diaphragm also increases and the pilot valve starts to re-close. Eventually, the seat returns to its original position, at which point water ceases to flow from the control chamber, so restoring equilibrium. The force exerted by the spring in the pilot valve will then have returned to its set value and the outlet pressure will have returned to the desired level.

Conversely, if the flow rate falls the outlet pressure initially rises. This causes the pilot valve to close and water then enters the control chamber with the result that the main valve starts to close and the outlet pressure falls. As the outlet pressure falls, the force acting beneath the diaphragm falls and pilot valve starts to reopen. When the seat has returned to its original position water will cease flowing into the control chamber and equilibrium will return. The force exerted by the spring in the pilot valve will then have returned to its set value and the outlet pressure will have returned to normal.

The outlet pressure is adjusted by turning a knob to alter the position of the nozzle relative to the seat. At the balance point, the distance between the end of the nozzle and the seat is always the same. Therefore, if the knob is turned in a direction to move the nozzle towards the seat, water will flow into the control chamber, closing the PRV and reducing the outlet pressure. The pilot valve will then start to open and equilibrium will not be restored until the diaphragm has moved sufficiently to restore the original separation between the end of the nozzle and the seat, at which point water will cease flowing into the control space. The spring will then be less compressed than previously and the outlet pressure will be lower.

Conversely, if the knob is turned in a direction to increase the separation between the nozzle and the seat, water will flow out of the control chamber, opening the PRV and increasing the outlet pressure. The pilot valve will then start to close and equilibrium will be reached when the diaphragm has moved sufficiently to restore the original separation between the nozzle and the seat. In this position, the spring will be more compressed and the outlet pressure will be higher.

The present invention concerns a pilot valve which is an improvement over that disclosed in WO 9923544, for example.

Viewed from one aspect, the present invention provides a pilot valve for controlling operation of a hydraulically-actuated pressure reducing valve, the pilot valve including a housing, a first valve member mounted in the housing for movement relative to the housing and to a second valve member in response to the outlet pressure of the pressure reducing valve, and an adjuster for adjusting the position of the second valve member relative to the housing, the pilot valve being adapted to control operation of the pressure reducing valve according to the relative positions of the first and second valve members, characterised in that one of the first and second valve members includes an aperture, and the other of the first and second valve members includes a blocking portion arranged for relative sliding movement across the aperture so that the relative movement between the first member and the second member varies the flow cross section through the aperture, the adjuster determining the flow cross section of the aperture that will be provided for a given relative position of the first and second valve members.

Thus, in use, for a given output pressure of the PRV in an equilibrium state, there will be a corresponding effective flow cross section of the aperture determined by the amount of the aperture that is blocked by the blocking portion. If the adjuster is then used to slide the blocking portion relative to the aperture, so that the effective cross section of the aperture is changed, there will be a change in flow through the pilot valve and the output pressure of the pressure reducing valve will be altered. For a chosen output pressure of the PRV, that pressure is maintained by the valve members moving relative to each other so that the amount of the aperture that is blocked by the blocking portion will vary. This has been found to provide more accurate and reliable control than the use of the nozzle and seat arrangement of WO 9923544.

The adjuster may provide relative sliding movement between the blocking portion and the aperture in the direction of relative movement of the valve members in response to the outlet pressure of the pressure reducing valve. This may be achieved by the use of a threaded member, rotation of which cause longitudinal movement of the blocking portion or aperture. In a preferred embodiment, however, the adjuster provides relative rotation of the blocking portion and aperture. In one possible arrangement, relative rotation between the aperture and the blocking portion would cause the aperture to be progressively blocked or opened by movement of an edge of the blocking portion across the aperture, in the direction of relative rotation. In a preferred arrangement, however, the arrangement is such that relative rotation between the aperture and the blocking portion will cause the aperture to be progressively blocked or opened by movement of an edge of the blocking portion across the aperture, in the direction of the axis of rotation. Thus, the blocking portion may have an axial extent which varies in the circumferential direction. In such an arrangement, an axially facing end portion of the blocking portion will be provided with a suitable profile. The profile could be a straight line, a curve, or any other desired profile to provide the required manner of variation of the flow cross section of the aperture in response to relative rotation. In preferred arrangements, an edge or end surface of the blocking portion is provided with a ramp profile. When there is relative rotation, a different part of the profile extends across the aperture and causes apparent movement of an edge across the aperture.

There may be a plurality of apertures with a plurality of associated blocking portions. The blocking portions may be provided on a single member. In one preferred arrangement, a rotatable blocking member is provided with a plurality of blocking portions, each having a longitudinally directed end region having an axial extent which varies in the circumferential direction. In a practical example, it has been found that an arrangement with two diametrically disposed apertures and two rotationally-symmetrical blocking portions gives satisfactory results.

In one preferred arrangement, the first valve member is arranged for longitudinal movement, in response to the outlet pressure of the pressure reducing valve, and is provide with the aperture. The second valve member is fixed except to the extent that there is movement of the blocking portion effected by the adjuster. Preferably, in this arrangement, the second valve member is arranged for rotation with respect to the housing, so as to control the flow cross section of the aperture by sliding the blocking portion across the aperture.

The first valve member may be in the form of a longitudinally extending tubular member which is in fluid communication with the outlet pressure of fluid from the pressure reducing valve and which has an aperture controlled by the blocking portion, the outlet from the aperture being in communication with a control chamber of the pressure reducing valve.

Alternatively and preferably the first valve member may be in the form of a longitudinally extending tubular member which is in fluid communication with a control chamber of the pressure reducing valve and which has an aperture controlled by the blocking portion, the outlet from the aperture being in communication with the outlet pressure of fluid from the pressure reducing valve.

In some preferred embodiments, the adjuster is connected to a motor. The adjuster may be connected to position indication means for indicating the position of the second valve member relative to the housing. Where the second valve member is arranged for rotation, the adjuster may be connected to position indication means for indicating the relative rotational position of the second valve member. These indication means may comprise a disc carrying visible markings. Preferably the housing of the pilot valve comprises a window adjacent at least a part of said disc.

The invention may be viewed from various different aspects. For example, viewed from another aspect, the invention provides a pilot valve for controlling operation of a hydraulically-actuated pressure reducing valve, the pilot valve including a housing, a first valve member mounted in the housing for longitudinal movement along an axis relative to the housing and to a second valve member in response to the outlet pressure of the pressure reducing valve; one of the first and second valve members being provided with an aperture and the other of the first and second valve members comprising a closure portion which varies the effective flow cross section of the aperture in accordance with relative longitudinal movement between the first and second valve members; and an adjuster for adjusting the relative rotational position of the first and second valve members, the closure portion having a profile such that relative rotation between the first and second valve members causes the closure portion to vary the effective flow cross section of the aperture.

In accordance with this aspect of the invention, routine operation of the pilot valve is provided by relative longitudinal movement of the first and second valve members to vary the flow through the aperture. Adjustment of the characteristics of the valve is provided by relative rotation between the first and second valve members, so that for a particular longitudinal orientation of the valve members, the effective flow cross section of the aperture can be altered.

It will be appreciated that the relative rotation referred to is rotation without longitudinal displacement. It is the rotational positions of the valve members that adjusts the pilot valve, not the longitudinal position that would be achieved by rotating the control knob in the arrangement disclosed in WO 9923544.

In a preferred arrangement, the pilot valve comprises two chambers defined in the housing, arranged axially, namely a fluid chamber and a spring chamber. The two chambers are separated from each other by sealing means which is connected to a spring in the spring chamber and is movable in the axial direction. Preferably, the sealing means comprises a flexible diaphragm connected to a spring engaging member. The spring engaging member preferably has a head portion which engages the spring, which is preferably a coil spring, and a cylindrical flange which extends axially through the centre of the spring. The first valve member is arranged for movement with the spring engaging member, and preferably is in the form of a tube which projects into the fluid chamber, extending axially through the inside of the cylindrical flange. Preferably, the tube has a radially directed aperture which opens into the fluid chamber. This aperture may be in a portion of the fluid chamber bounded by the cylindrical flange, which communicates with a main part of the fluid chamber. Preferably the tube is provided with an axial extension to a port for connection to a chamber of the pressure reducing valve. When the pilot valve is connected to the pressure reducing valve, preferably a conduit for connection to the port includes a flexible portion which allows for the movement of the first valve member relative to the pilot valve housing.

In this type of arrangement, the fluid chamber will be exposed to fluid pressure downstream of the pressure reducing valve, by means of a conduit connected to the fluid chamber.

In an arrangement as described above, the second valve member is preferably in the form of a sleeve mounted coaxially around the tubular first valve member in the region of the aperture, where the tube will generally be of circular cross section, the second valve member having a lateral opening or an axially directed end comprising a profiled edge portion. The second valve member will then be rotatable about the longitudinal axis so as to vary the extent to which the profiled edge blocks the aperture. The arrangement may be such that the aperture can be fully open or progressively blocked as the second valve member is rotated. There may be a position in which the aperture is fully closed.

In general, in preferred embodiments, the first and second valve members are in the form of axially-aligned, longitudinally-extending tubular members having at least a portion of one of the valve members located inside the other. The valve member comprising an aperture may be located around the outside the valve member comprising a closure portion or vice versa. Preferably the aperture-carrying valve member is of smaller diameter than the closure-portion-carrying valve member and is located inside it in the vicinity of the aperture.

In an alternative, the pilot valve comprises three chambers arranged along an axis, namely a first chamber, a second or middle chamber, and a third chamber. The first chamber is in fluid communication with the outlet pressure of the pressure reducing valve and is provided with a spring biased flexible diaphragm, which deflects along the axis as the pressure fluctuates. The first valve member is mounted for movement with the flexible diaphragm. The first valve member is in the form of a tube which extends along the axis, through the middle chamber and opens into the third chamber. The tube has a radially directed aperture which opens into the middle chamber, the middle chamber being in fluid communication with a chamber of the pressure reducing valve. The middle chamber is separated from the first chamber by a first flexible seal and from the third chamber by a second flexible seal. The first chamber is connected to the third chamber via a conduit, so that the third chamber is exposed to the outlet pressure of fluid from the pressure reducing valve. This fluid is exposed to the open end of the tube of the first valve member, and thus the aperture.

In such an arrangement, the second valve member is in the form of a generally cylindrical plug mounted in the tube in the region of the aperture, where the tube is of circular cross section, the plug having a profiled end facing the inlet into the tube from the third chamber. The plug is in sealing engagement with the wall of the tube and is rotatable about the longitudinal axis of the tube so as to vary the extent to which the plug blocks the aperture. The arrangement may be such that the aperture can be fully open or progressively blocked as the plug is rotated. There may be a position in which the aperture is fully closed.

The portion of the tube below the plug is preferably provided with an opening into the first chamber, so that the pressures on either side of the plug are substantially equal. This avoids pressure differentials that might hinder rotation of the plug.

This general arrangement of the pilot valve is new and inventive, and thus viewed from another aspect there is provided a pilot valve for controlling operation of a hydraulically-actuated pressure reducing valve, the pilot valve including a housing; first, second and third chambers arranged along an axis within the housing; the first chamber being arranged for fluid communication with the outlet pressure of the pressure reducing valve and being provided with a spring biased flexible diaphragm which deflects along the axis as the pressure fluctuates; a valve member mounted for movement with the flexible diaphragm, the valve member extending along the axis, through the middle chamber and into the third chamber, the valve member having a tubular end portion which is in fluid communication with the third chamber and has a radially directed aperture communicating with the second chamber; the second chamber being arranged for fluid communication with a chamber of the pressure reducing valve and being separated from the first chamber by a first flexible seal and from the third chamber by a second flexible seal; and the first chamber being in fluid communication with the third chamber; wherein means are provided for varying the effective flow cross section of the aperture in dependence on axial movement of the valve member in accordance with the outlet pressure of the pressure reducing valve, and an adjuster is provided for adjusting the effective flow cross section of the aperture that will be provided for a given relative axial position of the valve member.

The means for varying the effective flow cross section of the aperture in pilot valves according to the invention may be a blocking portion which is slid across the aperture, preferably by means of rotation, as described earlier. However, other arrangements are possible. For example, in a manner somewhat similar to that described in WO 9923544, the spacing between the aperture and another member may be altered. Such an arrangement could be provided by having a member which is inclined with respect to the axis so that as there is axial displacement, the spacing between the member and the aperture is varied. This could for example be provided by a conical member movable axially, which would be of particular use if there is a plurality of apertures spaced circumferentially.

The invention is of particular relevance in a system in which the adjuster is controlled by a module having microprocessing means which operates the adjuster in order to vary the output pressure of the pressure reducing valve in accordance with flow rate. Such an arrangement is described in International Patent Application PCT/GB2008/000265 filed on 24 Jan. 2008, the contents of which are incorporated herein by way of reference.

It has been proposed that the output of the PRV should be variable so that the pressure can be varied depending on demand, thus reducing the average pressure within the DMA and reducing problems with leakages and bursts. Other advantages of controlling the pressure actively include reduced fatigue on the pipe network, the provision of more constant supply pressure to consumers, and a reduction in pressure related consumption. It has, also been proposed that a pilot valve should be controlled electrically, using a controller.

International Patent Application PCT/GB2008/000265 discloses a controller for adjusting the output pressure of a pressure reducing valve supplying water to a consumer region, wherein the controller comprises a flow rate input for receiving a flow rate signal from a flow rate sensor for water flowing into the consumer region through the pressure reducing valve, and means adapted to provide data representative of the flow rate of water flowing into the consumer region through the pressure reducing valve in accordance with the flow rate signal; a control output for providing a signal to adjust the output pressure of the pressure reducing valve; data storage means storing parameters representing a relationship between the flow rate of water and a required output pressure from the pressure reducing valve in order to establish a desired minimum water pressure at a critical point in the consumer region; and processing means configured to process (i) the data representative of the flow rate and (ii) the stored parameters, so that a signal is provided from the control output in order to cause the pressure reducing valve to be adjusted to provide the required output pressure corresponding to the flow rate; characterised in that the parameters represent a relationship between the flow rate of water and the required output pressure from the pressure reducing valve, which is time dependent; the controller comprises a clock providing data representative of time; and the processing means is configured to access the data representative of time, in addition to the stored parameters and the data representative of the flow rate, so that the signal which is provided from the control output causes the pressure reducing valve to be adjusted to provide the required output pressure corresponding to the flow rate and the time.

Viewed from another aspect, International Patent Application PCT/GB2008/000265 discloses control means for a pilot valve of a water supply system pressure reducing valve which controls the output water pressure of the pressure reducing valve in accordance with a predetermined relationship between a required output flow pressure and flow rate, the predetermined relationship being defined by an equation which relates the desired output liquid pressure to a function of the flow rate which includes at least one constant, wherein the control means stores (a) the value of the or each constant and (b) a procedure for evaluating the function, so that for a given measured output flow rate from the pressure reducing valve the control means calculates the desired output liquid pressure by evaluating the function using the stored value of the or each constant and the measured output flow rate. In a preferred arrangement, the stored values of the or each constant are time dependent, so that when evaluating the function at a particular time, the output flow pressure that is determined will depend on time.

A pilot valve in accordance with the previous aspects of the present invention may be used in such previously-disclosed arrangements, the control means operating the adjuster of the pilot valve to control the output pressure for the pressure reducing valve.

An embodiment of the invention will now be described by way of example and with reference to the accompanying drawings, in which.

Figure 1:
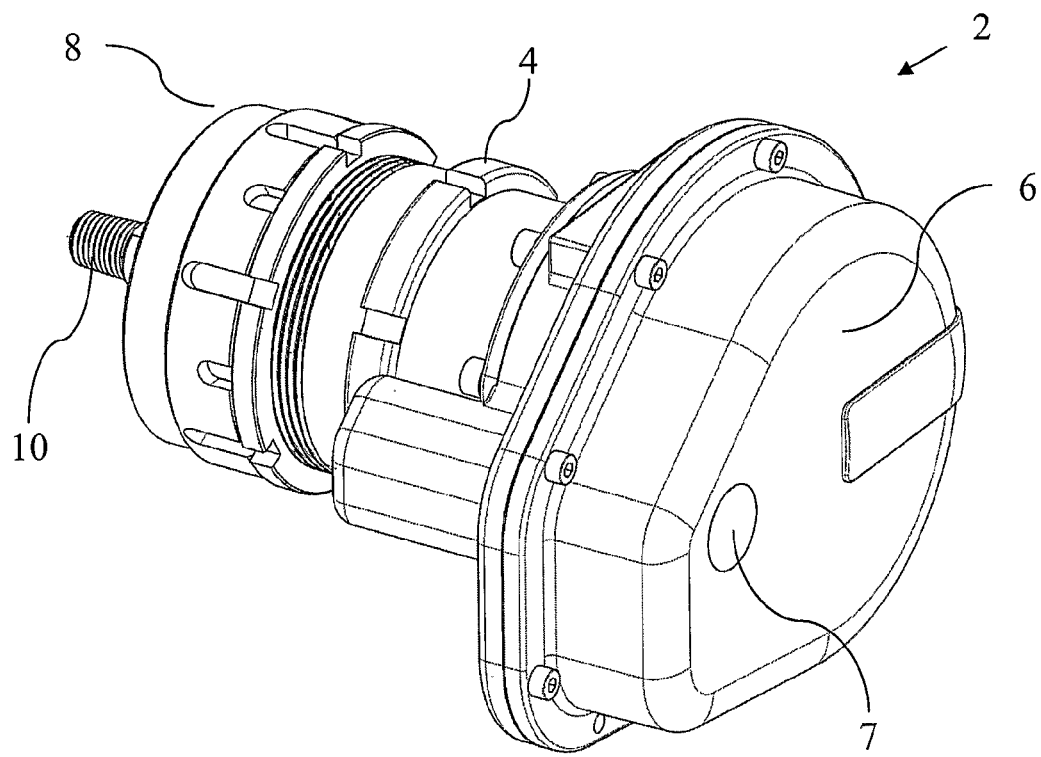
FIG. 1 is an perspective view showing the exterior of a pilot valve in accordance with the invention.

Referring now to FIG. 1, there is shown a perspective view of a pilot valve 2 in accordance with the invention having a main housing 4. To the rear of the main housing is bolted a motor housing 6, and to the front is attached a screw cap 8. An inlet port 10 protrudes through the screw cap 8. A viewing window 7 is located in the motor housing.

Figure 2:
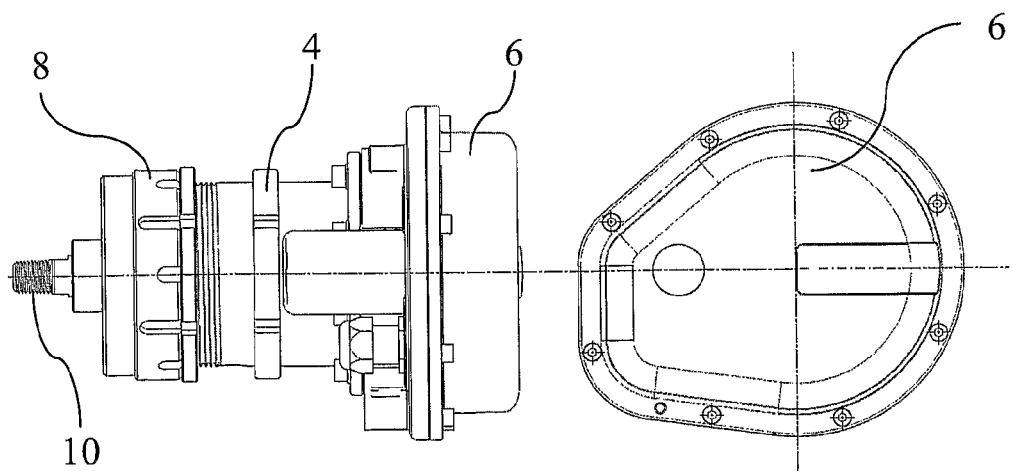
FIG. 2 shows side and rear elevations of the same pilot valve.

FIG. 2 shows the same pilot valve 2 from front and rear elevations. The main housing 4, motor housing 6, screw cap 8 and inlet port 10 are visible from the front elevation, while the rear elevation shows detail of the motor housing 6.

Figure 3:
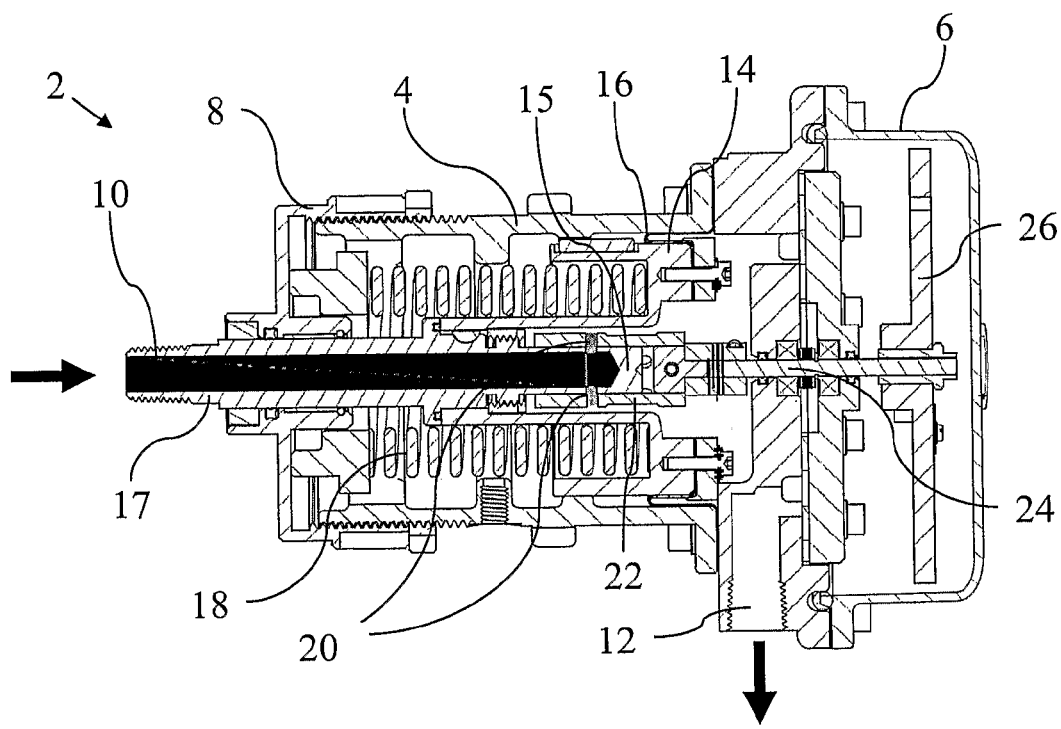
FIG. 3 is a cut-away side elevation of the pilot valve.

FIG. 3 shows a cut-away of the pilot valve 2 along a central vertical plane. Dark shading and arrows indicate the presence and flow of water in and through the pilot valve, from the inlet port 10 to an outlet port 12. Further details of the fluid flow path can be seen in FIG. 5. The pilot valve has a spring engaging member 14 attached to an annular diaphragm 16 and which is movable axially relative to the main housing 4. The spring engaging member 14 is has a head engaging one end of a coil spring 18 and a cylindrical flange extending through the centre of the spring. Also connected to the spring engaging member is a tubular valve member 15. The diaphragm 16 provides a barrier between water in the pilot valve and the cavity housing the spring 18. The tubular valve member 15 is provided with two diametrically-opposed, circular apertures 20 through which fluid may communicate from the inlet-port side of the inlet valve to the outlet-port side. The valve member 15 has an axial extension 17 which terminates in inlet port 10.

A rotatable valve blocking member 22 closely surrounds the tubular valve member 15 in the vicinity of the apertures. It is connected via a spindle 24 to an indicator wheel 26, the position indications of which are visible from outside the pilot valve through the viewing window 7.

Figure 4:
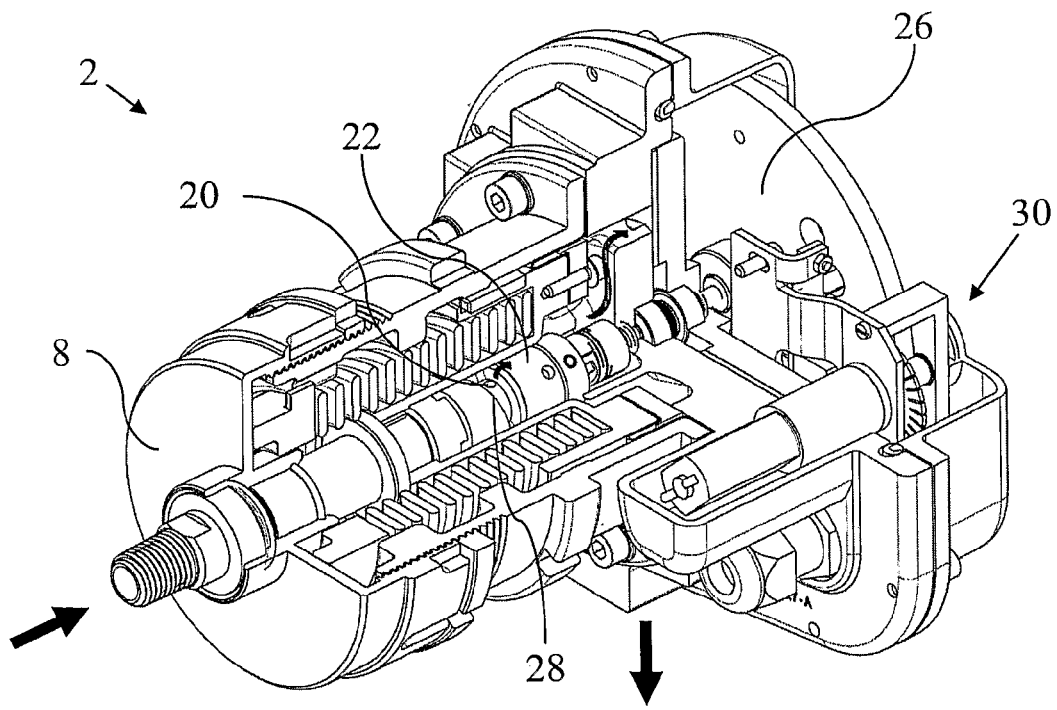
FIG. 4 is a cut-away perspective view of the pilot valve.

FIG. 4 shows a perspective cut-away of the pilot valve 2, including more detail of the aperture mechanism and of the inside of the motor housing 6. One of the two apertures 20 is shown. The valve blocking member 22 contains two diametrically-opposed, circumferentially-elongated holes (one of which is visible in FIG. 4) defining an edge profile 28. This edge profile 28 is inclined relative to both the circumferential and axial directions of the pilot valve, as can be seen more clearly in FIG. 6. The indicator wheel 26 and therefore the valve blocking member are rotatable by means of a motor and gearbox assembly 30 located inside the motor housing 6.

Figure 5:
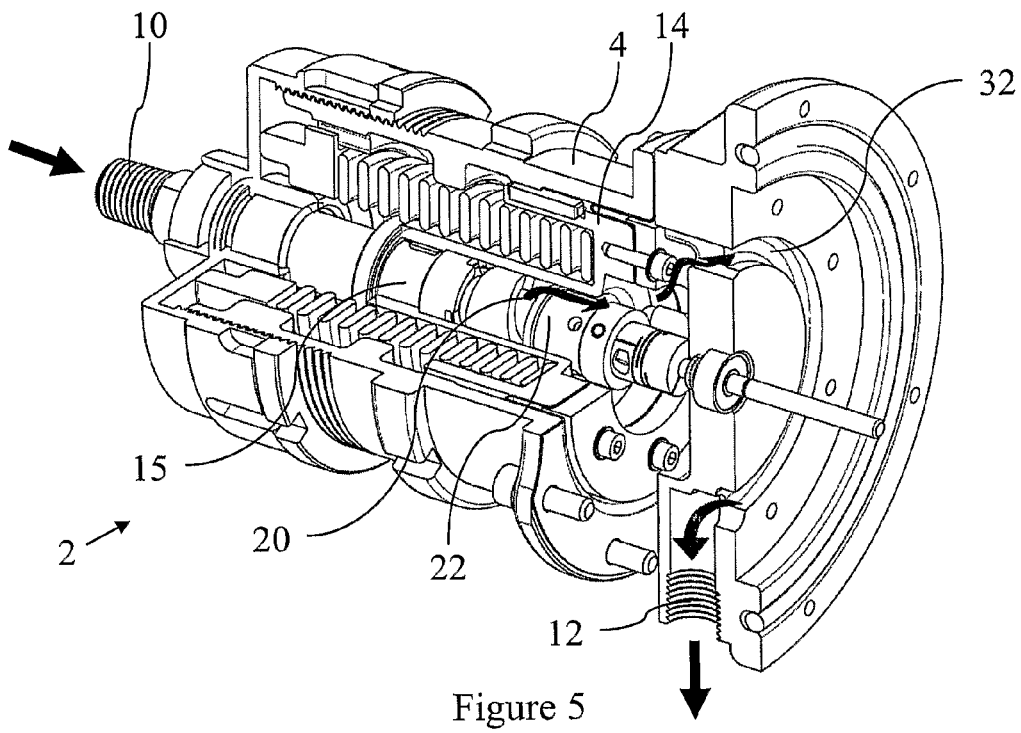
FIG. 5 is a cut-away perspective view of part of the pilot valve showing the transfer channel.

FIG. 5 shows part of the pilot valve 2 and indicates with arrows the direction of water flow through the pilot valve when the valve is open. Water enters through the inlet port 10, which may be connected to a chamber of a PRV via a flexible hose to allow for movement of the inlet port with respect to the pilot valve housing 4. The water then flows through the hollow middle of the tubular valve member 15. It exits the valve member through the two apertures 20 which are not fully blocked by the valve blocking member 22 when the valve is in an open state. It flows over the valve blocking member 22 and into a transfer chamber 32 lying between the main housing 4 and the motor housing 6. The transfer chamber 32 directs the water to the outlet port 12, from where it may reconnect with a main supply pipe downstream of a PRV.

Figure 6:
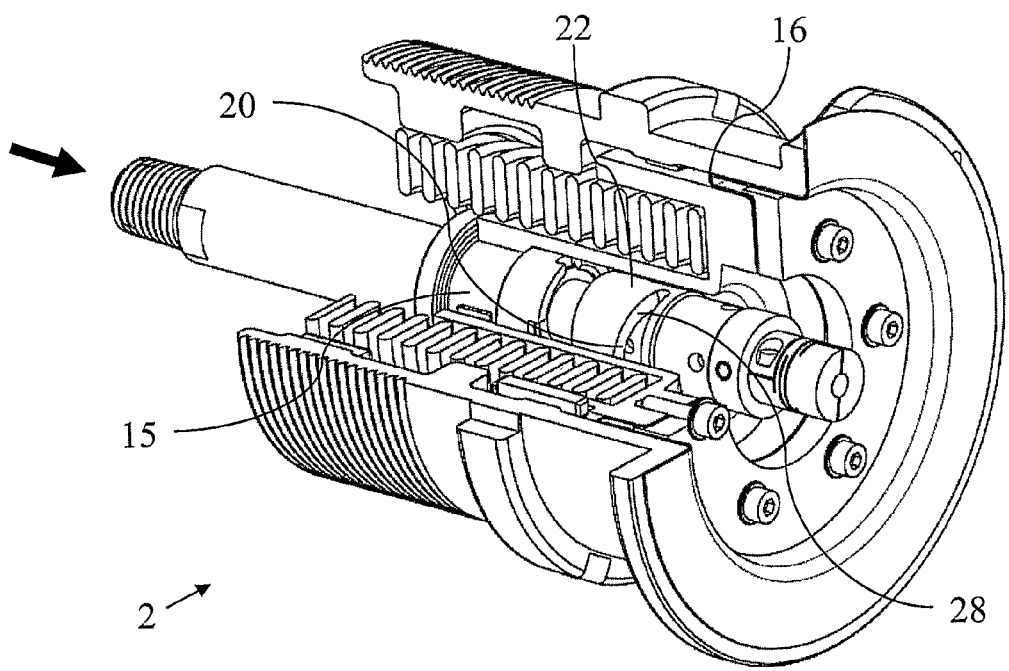
FIG. 6 is a detail cut-away view showing one of the apertures partially closed.

FIG. 6 shows in more detail one of the apertures 20 in a partially-closed state. The extent of the annular diaphragm 16 can also be seen. The inclined edge profile 28 of the valve blocking member 22 can be clearly seen; it is restricting the flow cross section of the aperture 20 to approximately half its maximum size. Due to the inclined angle of the edge profile 28, it can be seen that rotation of the valve blocking member 22 in one sense (clockwise when viewed from the right of the Figure) will increase the flow cross section of the aperture 20, while rotation in the opposite sense (anticlockwise) will decrease it. Additionally and independently of any rotational movement, it will be readily understood that axial movement of the spring engaging member towards the main body of the valve will increase the flow cross section of the aperture 20, while movement in the opposite direction will decrease it.

Figure 7:
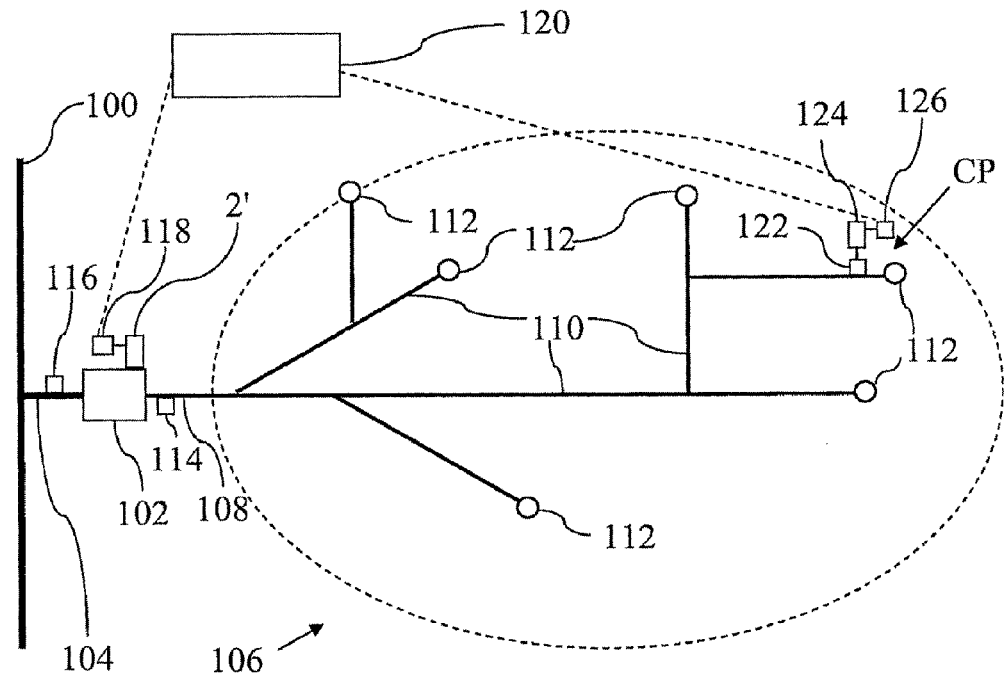
FIG. 7 is a schematic diagram of a water distribution system in accordance with an aspect of the present invention incorporating a different pilot valve in accordance with an aspect of the invention.

FIG. 7 shows a water distribution system in accordance with an aspect of the present invention. It incorporates a pilot valve T embodying an aspect of the invention but of a slightly different design to the pilot valve 2 of FIG. 1-6.

A main arterial water supply conduit 100 supplies water at a pressure P1 to a pressure reducing valve (PRV) 102 via a pipe 104, which in turn supplies water at a reduced output pressure P2 to a district metering area (DMA) 106 via output pipe 108, the DMA including a number of conduits 110 supplying a number of consumers 112. One of the consumers 112 is designated a critical point CP, being a point where the pressure P3 will typically be lower than elsewhere in the DMA 106 as a result of the distance of the Critical Point CP from the PRV 102 and/or the altitude of the Critical Point with respect to the PRV. Although only one Critical Point is indicated in the present embodiment, other embodiments may have multiple Critical Points.

Adjacent the PRV 102 are provided a first pressure measuring sensor 114 for measuring the output pressure P2 of the PRY, and a flow rate sensor 116 for measuring the flow rate M through the PRV. The flow rate sensor 116 is installed upstream of the PRY to reduce inaccuracies due to turbulent flow.

The signals from sensors 114 and 116 are fed to a control unit 118 for a pilot valve 2' in accordance with an aspect of the invention which adjusts the output pressure of the PRY in accordance with the measured flow rate and time in a manner described below, with the intention of providing an output pressure which is sufficient to maintain a required minimum pressure at the critical point CP.

The measured flow rate M and the output pressure P2 are transmitted from the control unit 118 over a wireless communications network to a remote central control station 120 where there is a data processing facility.

At the Critical Point CP is a second pressure measuring sensor 122 for measuring the pressure P3 at the Critical Point which is used in a calibration process as discussed below. It is connected to a data logger 124. The remote pressure sensor 122 and logger 124 may be a dedicated rugged integrated pressure transducer and logger with embedded software enabling statistical analysis. The sensor may be a temporary or a permanent installation. Information stored on the data logger might be retrieved manually by an engineer, who will connect to the logger by any suitable wired or short- or long-range wireless means. However, preferably the logger is connected to a communications unit 126 which, at intervals, transmits data by SMS or another suitable wireless means to the central control station 120 which processes the P3 data together with the P2 pressure data and the flow rate data received from the control unit 118, in order to transmit suitable control parameters to the control unit so that the output pressure of the PRV 102 will be controlled to provide the required pressure at the Critical Point.

Figure 8:
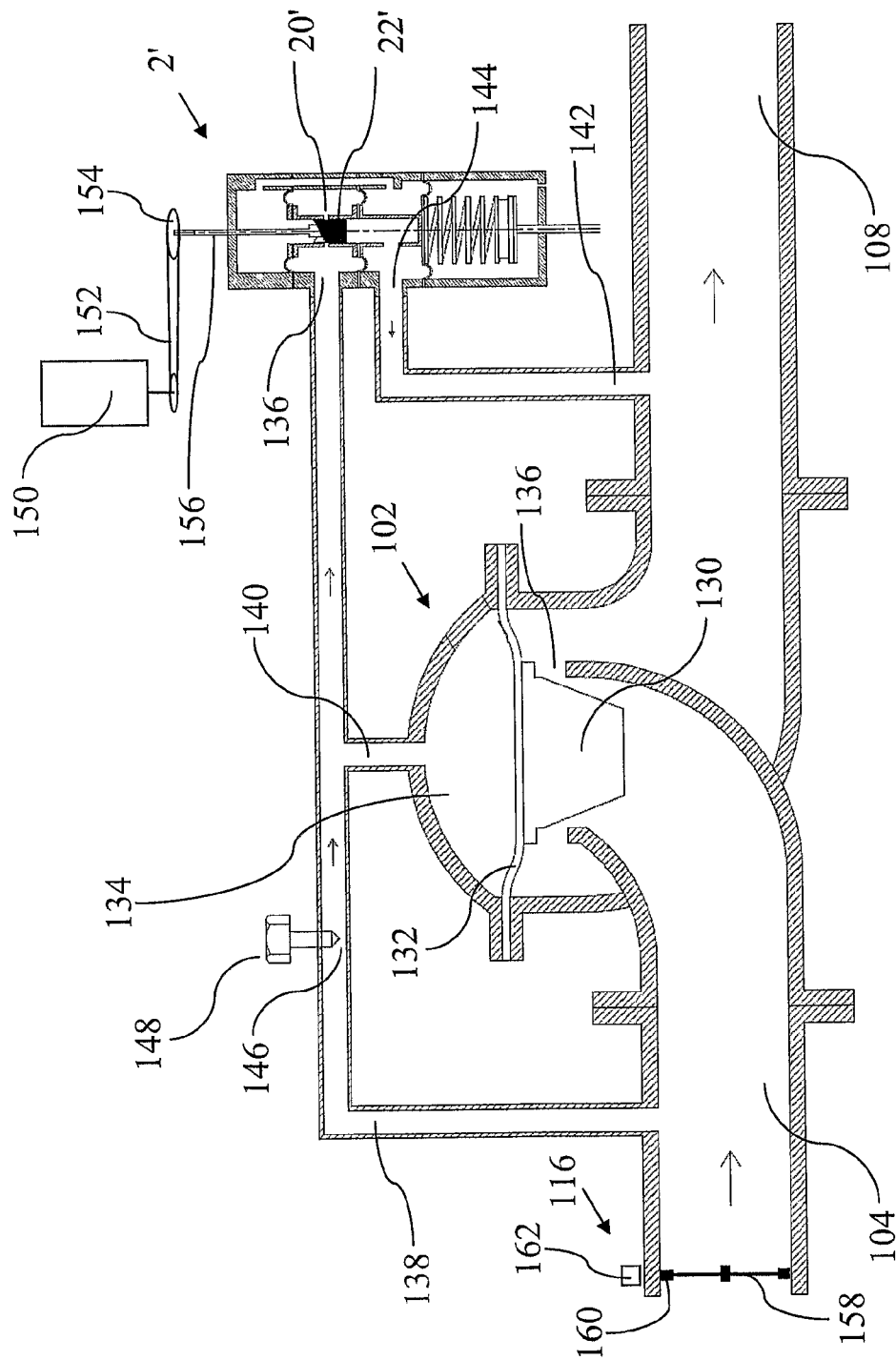
FIG. 8 is a cross-sectional schematic view, showing a part of the water distribution system of FIG. 7, with the PRV in an open state.

FIG. 8 shows a portion of the pipe system of FIG. 7 comprising the PRV 102 in an open state connected to the pilot valve 2'. The PRV sits between the upstream pipe 104 connected to the main arterial water supply conduit 100, and the downstream pipe 108 connected to the district metering area. A valve member 130 is provided on a diaphragm 132 which forms one side of a PRV control chamber 134. The valve member serves to control flow through an orifice 136 connecting the upstream and downstream pipes 104 and 108. A passage 138 connects the upstream pipe 104 to the inlet opening 136 of the pilot valve 2' and to the PRV control chamber 134 via a conduit 140. A passage 142 connects the outlet opening 144 of the pilot valve 2' to the downstream pipe 108. The passage 138 from the upstream pipe is provided with a restriction 146 upstream of the conduit 140 and the pilot valve, the restriction being set by means of a screw 148.

A motor 150, for example a stepper or other suitable motor, is connected by a drive-belt 152 to a gearwheel 154. This gearwheel is attached to an adjuster 156 so as to, cause rotation of the valve blocking member 22' on activation of the motor 150 and adjust the flow cross section through apertures 20'. The valve blocking member 22' comprises a sloped edge profile such that both rotation and longitudinal motion of the valve member, relative to the apertures, can independently cause the flow cross section of the apertures to be progressively increased or decreased. The motor 150 is connected to an output of the control unit 118.

The pressure in the PRV control chamber 134 can vary between the upstream, inlet pressure P1 and the downstream, output pressure P2 depending on the flow cross section of the pilot valve apertures 20' and the flow cross section at the restriction 146. In FIG. 8, the apertures 20' are shown completely open and the PRV is therefore completely open.

The flow meter 116 is located adjacent the PRV 102 in the upstream pipe 104. It may be of any suitable design, such as a differential pressure flow meter, a venturi tube, an orifice plate, etc. In the present embodiment an axial turbine rotor 158 is used. It has a magnet 160 on the tip of each vane, the passage of which is detected by a flow meter sensor unit 162 equipped with a reed switch or other sensing means such as a Hall effect sensor. The flow meter sensor unit 162 may calculate the flow from the reed switch activations by any standard approach. It may for example count the number of pulses over a time period, or it may use a pulse interval timing approach where the time interval between successive leading or trailing edges of pulses is determined. Preferably, the flow meter sensor unit is arranged to switch from calculating an averaged pulse count to timing a pulse interval when the flow is determined to be below a predetermined level.

In some embodiments, means may be provided for determining information relating to the position of the valve closure member 130, either directly or indirectly, and this information may be used to infer the flow rate through the pressure reducing valve by estimating the flow cross-section, or orifice size, in the PRV. This approach therefore provides an alternative to using the flow meter 116, which could then be dispensed with. More preferably, however, such an indirect flow rate sensing mechanism is used as a backup, able to detect failure of the principal flow rate sensor 116 and/or take over therefrom in case of such failure.

Figure 9:
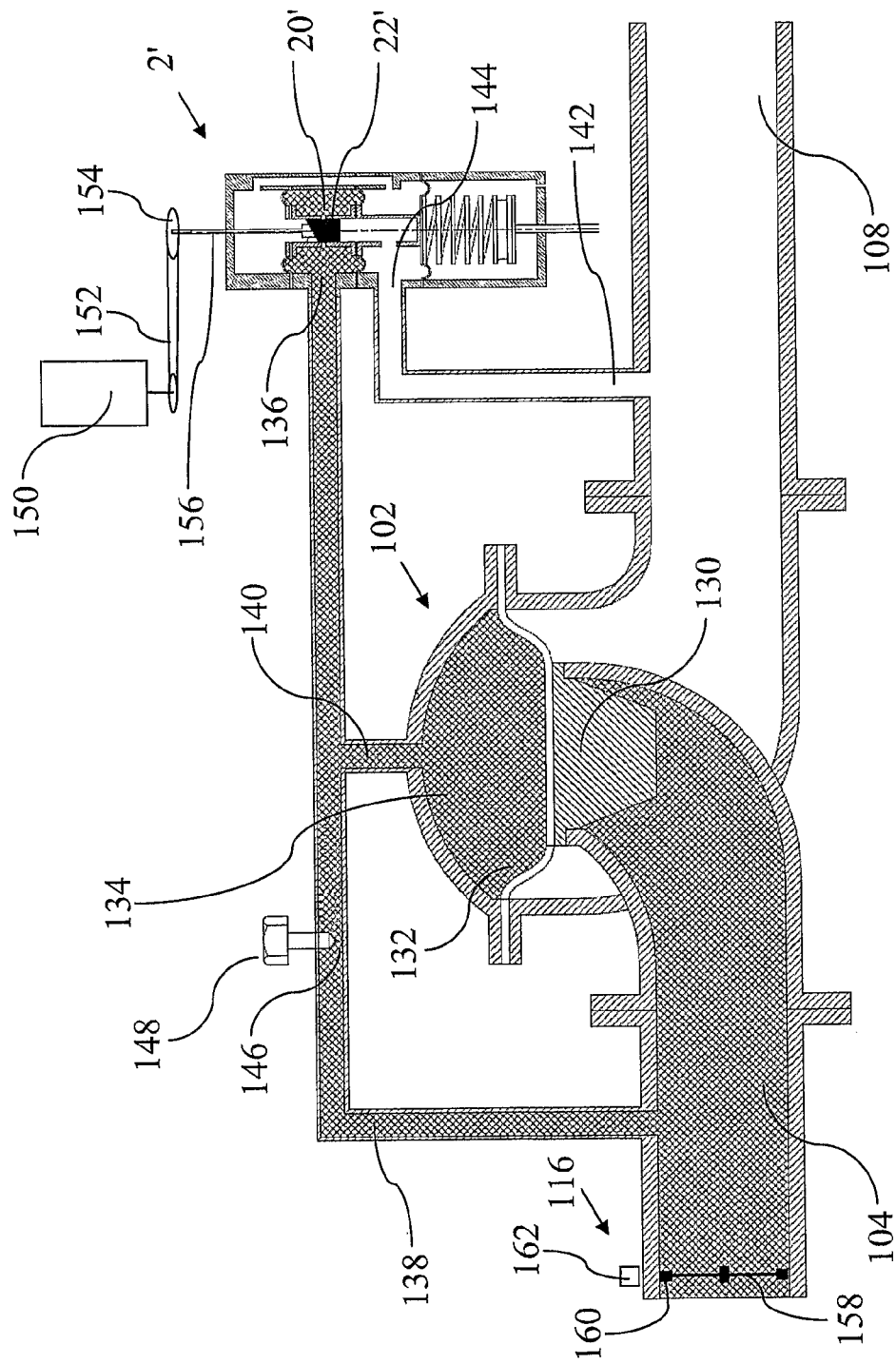
FIG. 9 is a cross-sectional schematic view showing the embodiment of FIG. 7 with the PRV in a closed state.

FIG. 9 shows the system of FIG. 8 with the apertures 20' completely closed and the PRV 102 completely closed as a result. When the pilot valve 2' is closed, the pressure of the fluid in the PRV control chamber 134 and at the inlet 136 to the pilot valve is equal to the pressure in upstream pipe 104.

Flow through the pilot valve is partly limited by the diameter of the passage 138 off the upstream pipe 104, which can be set by adjusting a restriction 146 by means of a screw 148. When the apertures 20' of the pilot valve are partially or fully open and the system has reached an equilibrium state, the ratio of the flow cross section of the apertures to the flow cross section at the restriction 146 determines the pressure within the PRV control chamber 134.

In use, the output pressure P2 in the downstream pipe 108 is adjusted by the motor 150 acting on the adjuster 154 to rotate the valve member 22', thereby altering the degree to which the pilot valve apertures 20' are blocked, and thus controlling the effective flow cross section of the apertures. Thus, for a given longitudinal position of the valve member 22' relative to the apertures 20', the effective flow cross section can be varied. Whatever relative rotational position is provided, equilibrium will be reached with an appropriate output pressure P2 established. Rotation in one sense will increase the output pressure P2, and in the other will decrease the output pressure. In the arrangement shown, rotation of the valve member 22' clockwise when viewed from above will cause more of the apertures 20' to be blocked and will increase the output pressure P2. Counter-clockwise rotation will cause more of the apertures 20' to be uncovered, and thus will decrease the output pressure P2. The extremes are as shown in FIG. 8 (apertures fully open and PRV fully open) and FIG. 9 (apertures fully closed and PRV fully closed).

Figure 10:
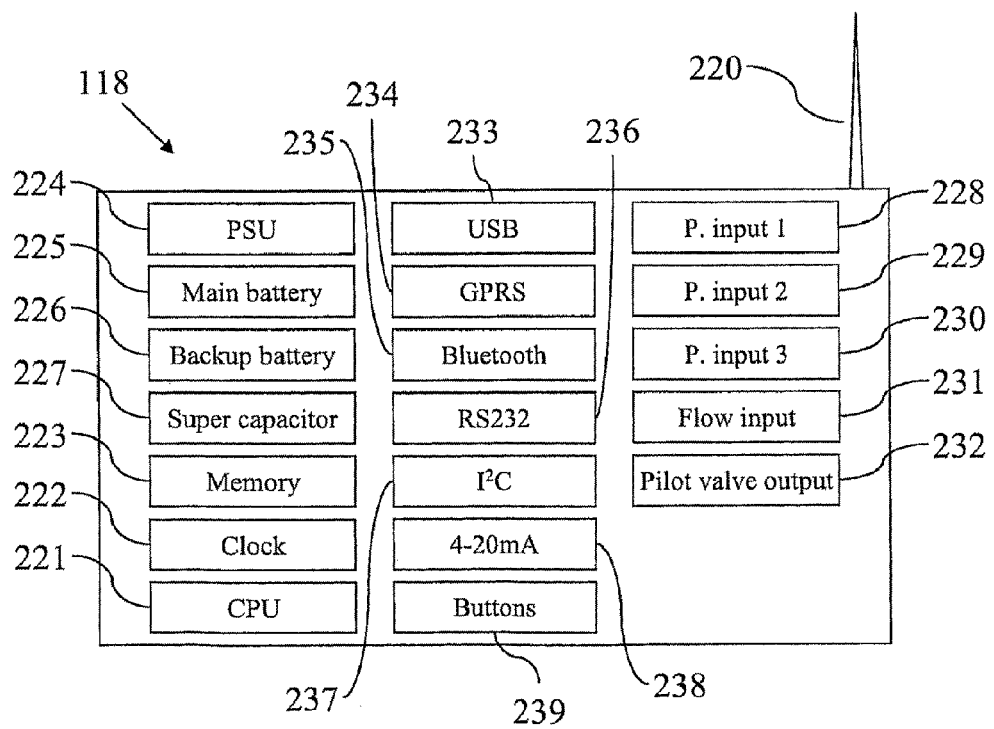
FIG. 10 is a schematic diagram showing a controller for use in the embodiment of FIG. 7.

FIG. 10 shows a schematic diagram of the control unit 118. Externally, it has an antenna 220 for wireless communication, a manual user interface for engineers comprising buttons 239, and ports for connecting to various sensors. Internally, the control unit 118 has a central processing unit 221 and memory 223, which may include some non-volatile memory. There is a clock 222 for providing the time and date to the CPU 221. The time and date may be updatable from a time server, for example at the central data processing facility 213 or via another remote communications link. A power supply unit 224 is provided for connection to an external power source. As it is unlikely that there will be a permanent power connection at the installation site, this is envisaged for use when the unit is elsewhere during initial configuration and any subsequent diagnostic work. The primary power is derived from a main battery 225, which may be of any suitable type, but is preferably lithium-based. A backup battery 226 is provided. Although not shown in the present embodiment, a solar cell may also be provided. A super-capacitor 227 provides a further reserve of electrical power, intended for the specific purpose of providing a sudden burst of power to activate a valve diverting flow from the primary controllable pilot valve 2' to a simpler, fixed-pressure backup pilot valve (not shown), for example using a solenoid. This could be triggered by a watchdog mechanism operable to detect a fault in the primary pilot valve or in the control unit 118, or if the main battery 225 and/or backup battery 226 were running low.

The control unit 118 has various I/O connections and communication mechanisms. Inputs include ports 228, 229, 230 for connection to pressure sensors and a port 231 for connection to the flow sensor. Pressure input 1 (228) is connected to the P2 pressure sensor 114; and flow input 231 to the PRV flow meter 116. Pressure input 2 (229) is connected to a sensor for the P1 pressure into the PRV, if such is provided. Pressure input 3 (230) may be connected to a differential pressure sensor arranged to monitor the pressure drop across a filter; or it may be used to monitor pressure in the PRV control space; or it may be reserved for a future application.

A pilot valve output port 232 is connected to the motor 150 for adjusting the pilot valve 2'.

Two wireless communication modules are provided: GPRS 234 for long-range communication to the central server 120, and Bluetooth 235 for local connections. Various wired connections are also possible, using the USB module 233, an I2C serial module 237 and an RS232 serial module 236. Four 20 mA wired connections 238 are provided. These wired connections may be diagnostic purposes, or for connecting additional sensors, such as rain, temperature or light sensors, or other additional modules. Other input/output mechanisms such as IrDA, an LCD display, a keyboard, etc. may be provided, but are not shown.

An optional mode of operation by the control unit 118 is "remote controlled" pressure modulation. In essence, this involves the control unit 118 monitoring and adjusting the P2 pressure output depending on the deviation from a set-point P3 pressure. To avoid problems due to un-predictable lag between changes in P2 and resultant P3 pressures, a "live" remote P3 pressure input is used with a built-in algorithm to constantly refine the relationship between flow and P2-P3. In this type of system, the control unit 118 receives the P3 values from the remote pressure sensor 122 either directly or via the central control facility 120.

However, the standard mode of operation in the present embodiment is for the control unit 118 to adjust the PRV output pressure P2 based on the sensor inputs, and in particular the measured flow rate M and the time T output by the clock 222, as well as any other relevant environmental sensor inputs, in accordance with parameters stored in the memory 223, which have been retrieved from the central server 120. A preferred arrangement for the control unit 118 to use these stored parameters is via a lookup table having axes for flow rate bands and time bands, and having numerical entries giving appropriate PRV output pressures P2. The lookup table might be three- or multi-dimensional, including axes for light intensity, a rain sensor, temperature, or other local environmental inputs. An alternative to using one or more lookup tables is for the CPU to evaluate a function which involves measured values and constants which are stored parameters.

The parameters are referred to by a controller program running on the processor 221, which determines the desired P2 pressure (possibly taking further constraints into account, such as the physical range of the PRV valve member, P1 pressure, or a pressure-change damping factor, as explained in more detail below) and sends the appropriate signals to the pilot valve motor 150 via the pilot valve output port 232. The P2 pressure input port 228 can supply feedback for this adjustment process. A P1 pressure input measurement at port 229 may be used to avoid the control unit 118 attempting to achieve a P2 pressure greater than P1, which would typically not be physically possible.

The speed of response to changes in flow rate and the associated changes in P2 are preferably controlled by a damping variable to limit the speed of change in pressure into the DMA.

The stored parameters are generated and loaded into the control unit 118 memory 223 as follows.

Especially in an initial setup phase, an engineer could manually determine the parameters based on DMA size, historical flow rates, distance and height difference to critical point, and use, for example, a PC or SMS interface to load these onto the control unit 118. Simple rules could be used to estimate the relationship variables. The engineer could use suitable software to assist in determining the parameters.

Manual parameter setting may be adjustable by, for example: direct user interface by LCD display menu on the controller; a received mobile text (SMS) message sent from a central control unit; commands sent over a mobile data service such as GPRS; or a PC interface through wired serial (RS232), infrared serial (IrDA) interface or optional short range wireless interface with a user friendly Graphical User Interface (GUI).

In normal usage, and optionally even at initial installation, the parameters or incremental updates thereto, are transmitted at intervals from the central server 120. This communication is preferably initiated by the control unit 118.

The parameters preferably take the form of one or more discrete lookup tables, as already described. They may, however, describe or parameterise a continuous curve or multi-dimensional surface, or parameterise some other relationship model, such as a neural network.

Although in some embodiments, the control unit 118 itself may generate appropriate parameters from raw data, in the present embodiment, the primary analysis of data is conducted on the central server 120. Typically initial training data will be gathered over a one or two week time period, but this period may be longer to capture seasonal effects, or several distinct sets of training data may be gathered. The measurements of P2 and the flow rate M are logged on the integral data logger in the control unit 118, and transmitted at intervals to the central facility 120. P3 at the Critical Point as logged on the remote data-logger 124 associated with sensor 122 located at the Critical Point. The remote logger is synchronised with the control unit 118, directly or indirectly—by both being synchronised with a clock at the central facility 120—before the data gathering period to ensure, both units have synchronised clocks. After the data gathering period, the remote data logger 124 downloads the P3 data by, for example direct serial connection (RS232 or IrDA) or by SMS or other means to the central server 120. The central server 120 analyses the relationship of P2-P3 to differing flow rates M and times T, optionally also taking into account other factors that may be relevant, such as weather conditions, sports fixtures, factory usage information, etc. and derives parameter values using regression or any other suitable statistical algorithm to establish a best fit curve, best fit multi-dimensional surface plot or other appropriate relationship model, which may be discrete or continuous. A supervised learning approach may be used; for example, a neural network, Bayesian classifier, etc. In this way, the relative importance of input factors such as sports fixtures, weather, season, etc. need not be assumed in advance, but can rather be learned and weighted appropriately by the software on the central server 120.

If the software is unable to determine an appropriate relationship, it will alert the operator who can interrogate the data and override with a manual curve or other relationship.

A modelled relationship on the central server 120 may be continuous or discrete over the input variables (flow rate, time, etc.). Although parameters fully describing a continuous, possibly multi-dimensional relationship could be loaded directly onto the control unit 118, in the present embodiment, a simplified lookup table is generated by the central server 120, in which flow, time, etc. are divided into appropriately-sized discrete intervals. This lookup table is loaded onto the control unit 118 and used as described above. The table may be loaded incrementally over time, and may be updated periodically as the central server revises the simplified lookup table to take account of predicted weather patterns for the next 24 hours or week, or future sports fixtures, such as a golf tournament, for example.

The parameters supplied to the control unit 118 from the central facility 120 are such that if there is an interruption in communications for any time, before updated parameters can be loaded, there will be sufficient parameters to adjust the output pressure appropriately over expected periods such as days of the week, weekends and so forth.

The central server 120 may control several independent DMAs, each with its own PRV. Where there are appropriate similarities between the DMAs, the central server 120 preferably uses the data obtained from one DMA to improve the accuracy of the parameters determined for a different DMA. By way of example only, it may be determined from data logged in respect of a first DMA that hours of sunshine has a more significant effect than month of the year in determining the optimal relationship between flow rate M, time T and P2-P3; this knowledge could be used in the optimising of parameters for a second DMA which may not even be equipped with a light meter. In this way, optimal use is made of the available training data.

The control unit 118 in any particular DMA may have the facility to temporarily override an existing relationship manually—i.e. to toggle between any existing automatically derived or manually set parameters to a new temporary set of parameters, with the ability to revert back to the original.

An optional flow rate monitoring system can be used to trigger an emergency P2 override. An emergency P2 pressure would be programmed to be triggered at a set flow rate. Should the flow rate M exceed the trigger flow rate, the control unit 118 will control the pilot valve 2' to cause the PRV to increase P2 to the emergency value. This function will provide high pressure supply to the DMA in the event of, for example, Fire Hydrant demand during scheduled low pressure periods.

All control methods may feature the following reporting functions: SMS, RS232, IrDA and (optional) wireless outputs; reports detailing all variable values; reports detailing max, min and average P1, P2, (P3 if measured), flow rates (min and Max values are recorded with date/time code); an alarm SMS function to alert for any parameters deviating from alarm set ranges or poor fully automatic curve matching; data-logger dump by RS232, for example.

Logging intervals may be adjustable, for example to 10 s, 30 s, 1 min, 5 min, 15 min, or an hour. In the present embodiment, the intervals are preferably every 15 minutes.

The control unit 118 may incorporate power saving functions. Thus, the control unit may make adjustments to the PRV only when measured P2 pressure has exceeded a set deviation from the target P2 pressure. The deviation can be adjusted. Increasing the deviation will make the P2 response coarser, but will result in fewer adjustments and hence increased battery life. When running on an optional external power supply, the maximum deviation can be reduced resulting in a finer P2 output characteristic.

Information relating to the pressure in the PRV control space may be used to infer how open or closed the PRV is, and may be used in some embodiments to estimate the PRV outlet pressure based on the inlet pressure P1, control space pressure and flow rate M. The control unit 118 could thereby detect a fault in the P2 outlet pressure sensor and for operate without a functioning P2 pressure sensor. Similarly, information relating to the control space pressure could be used in some embodiments to estimate the flow rate M through the PRY from information relating to the inlet pressure P1, outlet pressure P2 and control space pressure. The control unit 118 could thereby detect a fault in the flow sensor and/or operate without a functioning flow sensor.

Using battery power, typically the control unit will be set up so that adjustments are made roughly once per hour with more frequent adjustments (perhaps approximately every 15 minutes) during peak change times. An estimate of the typical number of adjustments per day would therefore be between 32 and 36. Further power saving can be achieved by optionally limiting the maximum number of adjustments per 24 hour period. Once the set number of adjustments have been made, the PRV will be set to a default (parameter set) output pressure. This function will be used whenever battery life needs to be in excess of a specified time period.

A chart could be provided to operators to enable them to set the control unit and estimate the associated battery life. A permanent memory function may be available to record the total number of adjustments since new batteries have been fitted.

In general, the control unit is preferably designed with close attention to minimising power consumption, with best practice in design and the latest low power technologies wherever possible.

The control unit may monitor battery life (including the battery life of any external SMS/PSTN or other communications units) and send an alarm (for example through an SMS message) to alert a central control system when battery life is below a set limit.

The control unit 118 includes a full range of local and remote pressure modulating capabilities, combined with several functions which will improve performance, simplify setup and reduce maintenance. The controller is designed and built to be reliable, rugged, versatile and easy to use. The unit is a multi-role controller and data-logger.

An engineer with a laptop computer or PDA may have access to software with the following functions:
Lookup table testing function to model various scenarios;
Setup Data Logger on controller;
Setup Data Logger on remote P3 pressure logger;
Download or read logger data;
Present in graphical and table views;
Establish spot values, min/max etc.;
Calibrate logger/controller;
Set logging rate;
Assign logger ID;
Adjust clock;
Configure all modes, inputs and outputs;
Adjust parameters; and
Setup communication.

As noted above, the control unit may control the PRV 102 using a balance point pilot valve; control is achieved by motor control of the rotational position of a control shaft. However, in an alternative embodiment direct solenoid valve control of the PRV is possible. In such an arrangement the control unit would be connected to two solenoid valves, one of which enables the PRV top chamber to be fed with P1 pressure, the second of which enables the PRV top chamber to reduce to P2. An optional third solenoid valve could enable the top chamber to vent to atmosphere, or optional venturi.

In general, communications between components used in embodiments of the invention can be via wired connections such as a serial (RS232), Universal Serial Bus (USB), Firewire™, LAN or WAN, optical fibre connections and so forth; by short range wireless communications such as infra red (IrDA), inductive coupling, Bluetooth, Wi-Fi and so forth; or by long range communications using a suitable radio frequency and protocol, a cellular mobile communications network using for example SMS messaging, and so forth. Communication may be direct, over a network such as the Internet, via a central control centre and so forth. A component may be configured as a web server to that connection to it and access to data is simplified.

It will be appreciated by those skilled in the art that references to water and other liquids throughout this application are not intended to be restrictive and the invention may be applied to the distribution of other fluids including gases.

The invention claimed is:

1. A fluid supply system comprising (i) a fluid-actuated pressure reducing valve and (ii) a pilot valve connected to the fluid-actuated pressure reducing valve for controlling an output pressure of the fluid-actuated pressure reducing valve, the pilot valve including:

a housing, a first valve member and a second valve member whose relative positions control flow through the pilot valve; the first valve member being provided on a movable spring-engaging member which engages a spring and which is mounted in the housing for movement relative to the housing in a longitudinal direction in response to the outlet pressure of the pressure reducing valve, movement of the spring-engaging member changing the relative positions of the first and second valve members;

an adjuster for varying the relative rotational positions of the first and second valve members about the longitudinal direction for a given position of the spring-engaging member, so as to cause the output pressure of the pressure reducing valve to alter; and a motor connected to the adjuster for rotating the adjuster; wherein one of the first and second valve members includes an aperture directed laterally of the longitudinal direction; the other of the first and second valve members includes a portion defining an edge which is positively-inclined relative to the longitudinal direction, and which extends completely across the aperture, and which is arranged for relative sliding movement across the aperture to vary the flow cross section through the aperture and thus the flow through the pilot valve; and the adjuster is arranged to adjust the relative rotational positions of the edge-defining portion and the aperture by sliding movement so as to adjust the flow cross section through the aperture for a given position of the spring-engaging member.

2. The fluid supply system of claim 1, wherein the edge has a constant inclined angle across the aperture.

3. The fluid supply system of claim 1, wherein the adjuster causes rotation of the second valve member.

4. The fluid supply system of claim 3, wherein the second valve member is fixed, relative to the housing, with respect to the longitudinal direction.

5. The fluid supply system of claim 4, wherein the second valve member is fixed, relative to the housing, except to the extent that there is movement of the edge-defining portion effected by the adjuster.

6. The fluid supply system of claim 1, wherein the aperture is provided in the first valve member and the edge-defining portion is provided by the second valve member.

7. The fluid supply system of claim 6, wherein the first valve member comprises an axially extending tubular member which is in fluid communication with a control chamber of the pressure reducing valve, the tubular member having the aperture therethrough and the outlet from the aperture being in communication with the outlet pressure of fluid from the pressure reducing valve.

8. The fluid supply system of claim 7, wherein the second valve member is in the form of a sleeve arranged coaxially with the first valve member.

9. The fluid supply system of claim 8, wherein the sleeve is mounted on the outside of the first valve member.

10. The fluid supply system of claim 8, wherein the sleeve has a circumferentially extending hole therein which defines the edge of the edge-defining portion.

11. The fluid supply system of claim 1, wherein there is a plurality of apertures and a corresponding plurality of edge-defining portions arranged for relative sliding movement across the apertures to vary the flow cross section through the apertures.

12. The fluid supply system of claim 11, wherein there are two diametrically opposite apertures.

13. The fluid supply system of claim 1, wherein the adjuster is connected to a position indicator arranged to indicate the position of the second valve member relative to the housing.

14. The fluid supply system of claim 1, wherein the edge-defining portion varies the effective flow cross section of the aperture in accordance with relative longitudinal movement between the first and second valve members; and the adjuster is arranged to adjust the relative rotational positions of the first and second valve members, the edge-defining portion having a profile such that relative rotation between the first and second valve members causes the edge-defining portion to vary the effective flow cross section of the aperture.

15. The fluid supply system of claim 11, wherein the plurality of edge-defining portions are provided on a single member.

16. The fluid supply system of claim 1, wherein the aperture is circular.

17. The fluid supply system of claim 1, wherein the edge of the edge-defining portion is defined by an axially-directed end of said other valve member.

18. The fluid supply system of claim 1, wherein the adjuster is arranged to adjust the relative rotational positions of the edge-defining portion and the aperture by sliding movement, so as to adjust the flow cross section through the aperture for a given position of the spring-engaging member, without longitudinal displacement relative to the housing.

19. The fluid supply system of claim 1, further comprising a controller configured to control the pilot valve in dependence on the output flow rate of the fluid-actuated pressure reducing valve.

20. The fluid supply system of claim 1, wherein the motor is housed in a motor housing, which is fixed to the housing of the pilot valve.

21. A method of using a fluid supply system comprising the steps of:
providing a fluid supply system including a fluid-actuated pressure reducing valve and a pilot valve connected to the fluid-actuated pressure reducing valve for controlling an output pressure of the fluid-actuated pressure reducing valve, where the pilot valve includes a housing, a first valve member and a second valve member whose relative positions control flow through the pilot valve, the first valve member being provided on a movable spring-engaging member which engages a spring and which is mounted in the housing for movement relative to the housing in a longitudinal direction in response to the outlet pressure of the pressure reducing valve, movement of the spring-engaging member changing the relative positions of the first and second valve members, an adjuster for varying the relative rotational positions of the first and second valve members about the longitudinal direction for a given position of the spring-engaging member, so as to cause the output pressure of the pressure reducing valve to alter, and a motor connected to the adjuster for rotating the adjuster, wherein one of the first and second valve members includes an aperture directed laterally of the longitudinal direction; the other of the first and second valve members includes a portion defining an edge which is positively-inclined relative to the longitudinal direction, and which extends completely across the aperture, and which is arranged for relative sliding movement across the aperture to vary the flow cross section through the aperture and thus the flow through the pilot valve, and the adjuster is arranged to adjust the relative rotational positions of the edge-defining portion and the aperture by sliding movement so as to adjust the flow cross section through the aperture for a given position of the spring-engaging member; and
operating the fluid supply system to control the output pressure of the fluid-actuated pressure reducing valve.

22. The method of claim 21, further comprising the step of:
using a controller to control the pilot valve in dependence on an output flow rate from the fluid-actuated pressure reducing valve.

23. The method of claim 22, wherein the fluid supply system is a water supply system.

24. The fluid supply system of claim 1, wherein the aperture has a maximum dimension and wherein the edge that is positively-inclined relative to the longitudinal direction is longer than said maximum dimension.

25. The fluid supply system of claim 1, wherein the edge that is positively-inclined relative to the longitudinal direction is extendable completely across the aperture such that the aperture is entirely occluded by the portion defining the edge on one side of the edge and is entirely open on the other side of the edge.

26. The fluid supply system of claim 1, wherein the edge that is positively-inclined relative to the longitudinal direction forms an edge of a second aperture that has a different geometry from, and is larger than, the aperture.

* * * * *